(12) United States Patent
Lan et al.

(10) Patent No.: US 11,814,538 B2
(45) Date of Patent: Nov. 14, 2023

(54) COMPOSITE MEMBRANE AND PACKAGING STRUCTURE

(71) Applicant: ShenZhen YUTO Packaging Technology Co., Ltd., Shenzhen (CN)

(72) Inventors: Xi Lan, Shenzhen (CN); Liyu Liao, Shenzhen (CN); Wei Zhong, Shenzhen (CN); Yu Song, Shenzhen (CN); Zhaohui Yu, Shenzhen (CN); Yequn Jiang, Shenzhen (CN)

(73) Assignee: ShenZhen YUTO Packaging Technology Co., Ltd, Guangdong (CN)

( * ) Notice: Subject to any disclaimer, the term of this patent is extended or adjusted under 35 U.S.C. 154(b) by 59 days.

(21) Appl. No.: 17/517,636

(22) Filed: Nov. 2, 2021

(65) Prior Publication Data

US 2022/0389271 A1 Dec. 8, 2022

(30) Foreign Application Priority Data

Jun. 4, 2021 (CN) .......................... 202110627649.6

(51) Int. Cl.
| | |
|---|---|
| B32B 3/10 | (2006.01) |
| C09D 175/12 | (2006.01) |
| B05D 5/06 | (2006.01) |
| B05D 7/00 | (2006.01) |
| C08J 7/04 | (2020.01) |
| C09D 167/00 | (2006.01) |

(Continued)

(52) U.S. Cl.
CPC ............. *C09D 175/12* (2013.01); *B05D 5/06* (2013.01); *B05D 7/50* (2013.01); *B32B 27/06* (2013.01); *C08J 7/042* (2013.01); *C09D 7/63* (2018.01); *C09D 163/00* (2013.01); *C09D 167/00* (2013.01); *B32B 7/06* (2013.01); *B32B 2255/205* (2013.01); *B32B 2255/26* (2013.01); *B32B 2307/4023* (2013.01)

(58) Field of Classification Search
None
See application file for complete search history.

(56) References Cited

U.S. PATENT DOCUMENTS

2017/0144344 A1* 5/2017 Schmidt .................. B29C 45/40

FOREIGN PATENT DOCUMENTS

CN 104945565 A * 9/2015

OTHER PUBLICATIONS

Machine translation of CN104945565A (Year: 2015).*

* cited by examiner

*Primary Examiner* — Christopher M Polley
(74) *Attorney, Agent, or Firm* — Arch & Lake LLP

(57) ABSTRACT

The present disclosure relates to a composite membrane and a packaging structure. The composite membrane comprises: a carrier layer; and an information layer, wherein the information layer is disposed on one side of the carrier layer along thickness direction of the composite membrane, and the information layer further comprises a light-transmitting layer, a first pattern layer, and a second pattern layer, which are disposed along the thickness direction of the composite membrane, wherein: the first pattern layer is disposed close to the carrier layer; the light-transmitting layer is disposed on one side of the first pattern facing layer away from the carrier layer; the second pattern layer is disposed on one side of the light-transmitting layer facing away from the carrier layer, and the second pattern layer and the first pattern layer present different visual information of one multi-dimensional object.

14 Claims, 3 Drawing Sheets

(51) Int. Cl.
*C09D 163/00* (2006.01)
*C09D 7/63* (2018.01)
*B32B 27/06* (2006.01)
*B32B 7/06* (2019.01)

COMPOSITE MEMBRANE AND PACKAGING STRUCTURE

CROSS-REFERENCE TO RELATED APPLICATION

The present application is based on and claims the priority to the Chinese Patent Application No. 202110627649.6, filed on Jun. 4, 2021, the entire content of which is hereby incorporated by reference for all purposes.

TECHNICAL FIELD

The disclosure relates to packaging materials, specifically, a composite membrane material and a packaging structure.

BACKGROUND

Composite membranes include transfer membranes and non-transfer membranes, which are widely used in the field of packaging materials, and are favored by people in the industry and outsiders due to their low production costs and exquisite appearance. In the application of composite membranes, people can choose different types of composite membranes to decorate the surface of objects according to their needs, which have functions such as aesthetics or heat resistance. At the same time, the composite membranes also have the advantage of relatively low production costs.

Sometimes the composite membrane can usually present a variety of patterns (such as text patterns, cartoon patterns, etc.), but the composite membrane usually can only present a single image effect (such as a flat image effect), so how to optimize the image effect presented in the composite membrane is what the technician needs to consider.

SUMMARY

The present disclosure provides a composite membrane and a packaging structure.

The first aspect of the present disclosure provides a composite membrane, and the composite membrane comprises: a carrier layer; and an information layer, wherein the information layer is disposed on one side of the carrier layer along thickness direction of the composite membrane, and the information layer further comprises a light-transmitting layer, a first pattern layer, and a second pattern layer, which are disposed along the thickness direction of the composite membrane; wherein: the first pattern layer is disposed close to the carrier layer; the light-transmitting layer is disposed on one side of the first pattern layer facing away from the carrier layer; and the second pattern layer is disposed on one side of the light-transmitting layer facing away from the carrier layer, and the second pattern layer and the first pattern layer present different visual information of one multi-dimensional object.

The second aspect of the present disclosure provides a packaging structure, and the packaging structure comprises a composite membrane as described above.

BRIEF DESCRIPTION OF THE DRAWINGS

Hereinafter, the examples of the present disclosure will be explained in detail with reference to the drawings.

DETAILED DESCRIPTION

Figure 1:
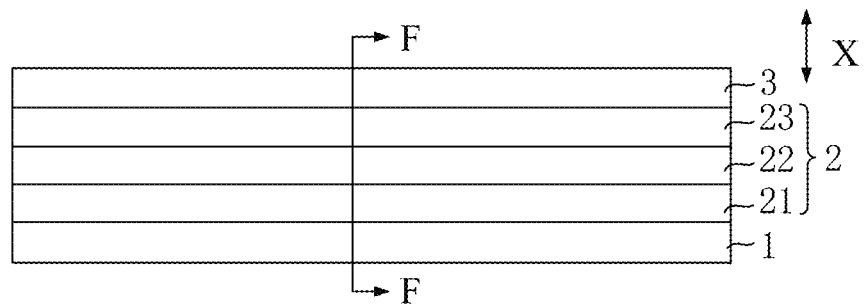
FIG. 1 shows a schematic structure of a composite membrane according to one or more examples of the present disclosure.

The examples of this disclosure will be further described in conjunction with reference to the accompanying drawings. Through the above drawings, the specific examples of the present disclosure have been shown, which will be described in more detail later. These drawings and text descriptions are not intended to limit the scope of the concept of the present disclosure in any way, but to explain the concept of the present disclosure for those skilled in the art by referring to specific examples.

The examples of the present disclosure will be described in detail here, and examples thereof are shown in the accompanying drawings. When the following description refers to the drawings, unless otherwise indicated, the same numbers in different drawings indicate the same or similar elements. The implementation manners described in the following examples do not represent all implementation manners consistent with the present application. On the contrary, they are merely examples of devices and methods consistent with some aspects of the application as detailed in the appended claims.

It should be noted that in this article, the terms "include," "include" or any other variants thereof are intended to cover non-exclusive inclusion, so that a process, method, article or device including a series of elements not only includes those elements. It also includes other elements that are not explicitly listed, or elements inherent to the process, method, article, or device. Without more restrictions, the element defined by the sentence "including a . . . " does not exclude the existence of other same elements in the process, method, article or device that includes the element. In addition, the application is implemented differently. The parts, features, and elements with the same name in the examples may have the same meaning or different meanings, and their specific meanings need to be determined by their interpretation in the specific embodiment or further combined with the context in the specific embodiment.

It should be understood that although the terms first, second, etc. may be used herein to describe various information, the information should not be limited to these terms. These terms are only used to distinguish the same type of information from each other. For example, without departing from the scope of this document, the first information may also be referred to as second information, and similarly, the second information may also be referred to as first information. Depending on the context, as used herein, the term "if" may be construed as "at . . . when" or "when . . . upon" or "in response to determining." Furthermore, as used herein, the singular forms "a", "an" and "the" are intended to also include the plural forms, unless the context dictates to the contrary. It should be further understood that the terms "comprising" and "including" indicate the presence of the described features, steps, operations, elements, components, items, types, and/or groups, but do not exclude one or more other features, steps, operations, The existence, appearance or addition of elements, components, items, categories, and/or groups. The terms "or" and "and/or" used herein are interpreted as inclusive or mean any one or any combination. Therefore, "U, V or W" or "U, V and/or W" means "any of the following: U; V; W; U and V; U and W; V and W; U, V and W." An exception to this definition will only occur when the combination of elements, functions, steps or operations is inherently mutually exclusive in some way.

It should be understood that the specific examples described here are only used to explain the present application, and are not used to limit the present application.

DESCRIPTION OF NUMERAL REFERENCES 1. the carrier layer;
11. the base film;
12. the release layer;
2. the information layer;
21. the first pattern layer;
22. the light-transmitting layer;
23. the second pattern layer;
3. the light-transmitting protection layer;
4. the light-transmitting metal layer;
X. The Thickness Direction.

The composite membrane and packaging structure are provided by the examples of the present disclosure, wherein the composite membrane is provided with an information layer including a first pattern layer, a second pattern layer and a light-transmitting layer, and the light-transmitting layer is arranged between the first pattern layer and the second pattern layer. The light-transmitting layer can create a sense of distance between the first pattern layer and the second pattern layer, wherein the first pattern layer and the second pattern layer present different visual information of the same multi-dimensional object. When the composite membrane is viewed from different angles, pattern information of different views of the object can been seen, such that the observer may see a multi-dimensional image (e.g., three-dimensional image, four-dimensional image, etc.) of the object, showing a multi-dimensional visual relief effect. In addition, the structure of the composite membrane is simple, and easy to process/manufacture, such the production cost can be lowered effectively.

The example of the present application provides a composite membrane, including: a carrier layer 1; an information layer 2, located on one side of the carrier layer 1 along the thickness direction X of the composite membrane, and the information layer 2 includes light-transmitting layer 22, arranged along the thickness direction X of the composite membrane, and at least two pattern layers; wherein the light-transmitting layer 22 is disposed between the adjacent pattern layers; wherein at least two pattern layers illustrate distinct visual information of a multi-dimensional object.

In an alternative example, wherein the information layer 2 comprises a light-transmitting layer 22, disposed in the thickness direction of the composite membrane, and at least two pattern layers, wherein the light-transmitting layer 22 is provided between the adjacent pattern layers. For example, the information layer 2 may include a first light-transmitting layer, a first pattern layer 21 and a second pattern layer 23, wherein the first pattern layer 21 is disposed adjacent to the carrier layer 1, wherein the first light-transmitting layer is disposed on a side of the first pattern layer 21 that faces away from the carrier layer 1, wherein the second pattern layer 23 is disposed on a side of the first light-transmitting layer that faces away from the carrier layer 1; also, for example, the information layer 2 may be sequentially stacked by the first pattern layer 21, the first light-transmitting layer, the second pattern layer 23, the second light-transmitting layer, and the third pattern layer.

In the composite membrane provided in the present application, the light-transmitting layer 22 of the information layer 2 creates a sense of distance between the pattern layers on both sides of the light-transmitting layer 22. By providing desirable distances between each light-transmitting layer 22 and the pattern layers, each pattern layer and the light-transmitting layer 22 are superimposed to present the corresponding display object with a multi-dimensional relief effect.

Figure 2:
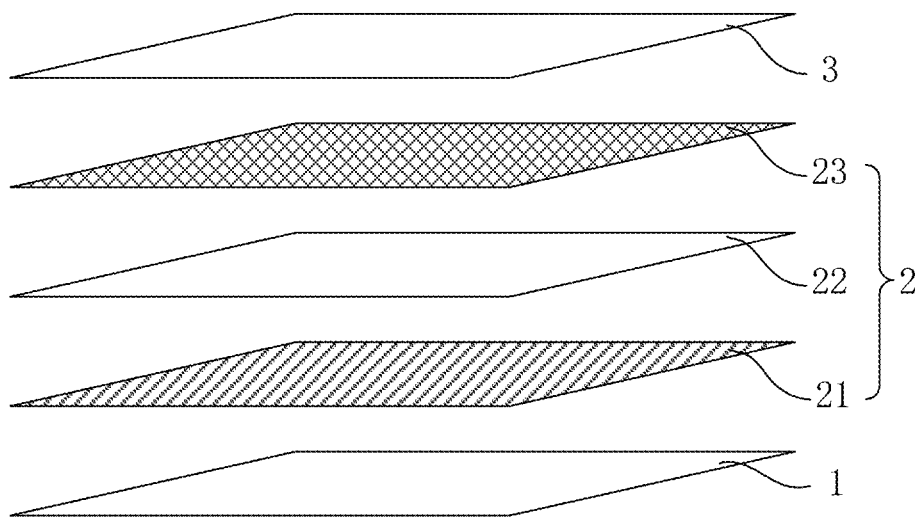
FIG. 2 shows an exploded schematic diagram of FIG. 1.
Figure 3:
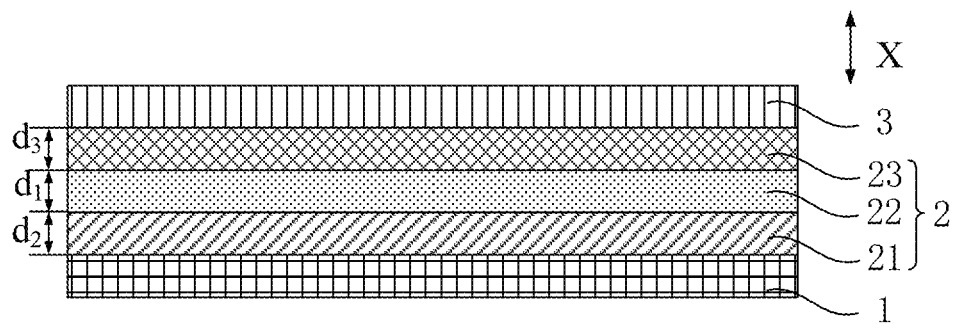
FIG. 3 shows a cross-sectional view of a schematic structure of FIG. 1 in the F-F direction.

In an alternative example, as shown in FIGS. 1 to 3, the composite membrane includes a carrier layer 1 and an information layer 2, and the information layer 2 is located on one side of the carrier layer 1 along the thickness direction X of the composite membrane. The information layer includes a first pattern layer 21, a light-transmitting layer 22 and a second pattern layer 23 arranged along the thickness direction of the composite membrane. Wherein the first pattern layer 21 is provided near the carrier layer 1. Wherein the light-transmitting layer 22 is disposed on a side of the first pattern layer 21, this side of the first pattern layer 21 facing away from the carrier layer 1. Wherein the second pattern layer 23 is disposed on a side of the light-transmitting layer 22, this side of the light-transmitting layer 22 facing away from the carrier layer 1; and the second pattern layer 23 and the first pattern layer 21 present different visual/surface information of one multi-dimensional object.

Specifically, the first pattern layer 21 and the second pattern layer 23 present different visual/surface information of the same multi-dimensional object. The different visual/surface information of the same multi-dimensional object may be the same or may be different, and therefore, the first pattern layer 21 and the second pattern layer 23 may be the same or different. The light-transmitting layer 22 is provided in between the first pattern layer 21 and the second pattern layer 23. When seeing the second pattern layer 23 with a human eye, the first pattern layer 21 can be simultaneously seen through the light-transmitting layer 22. Since the light-transmitting layer 22 presents, the human eye, when viewing in the composite membrane, would perceive a sense of distance between the first pattern layer 21 and the second pattern layer 23. When the composite membrane was observed from different angles, a human eye would perceive pattern information of the same object at different angles, i.e., generating a multidimensional effect (e.g., a three-dimensional effect, a four-dimensional effect), such that the first pattern layer 21 and the second pattern layer 23 create a visual effect of a multi-dimensional relief.

In the composite membrane provided in the present disclosure, the light-transmitting layer 22 is provided between the first pattern layer 21 and the second pattern layer 23, wherein the first pattern layer 21 and the second pattern layer 23 illustrate different visual/surface information of the same multi-dimensional objects. The light-transmitting layer 22 has a certain transparency, so that when a human eye sees the second pattern layer 23, it is possible to see the first pattern layer 21 at the same time, through the second pattern layer 23 and the light-transmitting layer 22. The transparency of the light-transmitting layer 22 also creates a visual sense of distance between the first pattern layer 21 and the second pattern layer 23, such that the human eye can observe a visual effect of a multi-dimensional relief pattern on the composite membrane. In addition, the composite membrane provided by the present disclosure has a simple structure, is easy to process and manufacture, and effectively reduces the production cost of the composite membrane.

In an optional example, reprinting may be performed on the composite membrane provided in the example of the present disclosure. That is, a specific printing pattern is printed on the composite membrane, so that the multi-dimensional relief image and the printed image presented in the composite membrane may be superimposed on each other, and the composite membrane presents a more colorful visual effect.

In an alternative example, a light-transmitting layer 22 provided has a light transmittance A≥98.7%, such that brightness difference, perceived by a human eye, between the light reflected by the first pattern layer 21 and the light reflected by the second pattern layer 23 is relatively small, and not easily recognize human eyes. So, the transition between the first pattern layer 21 and the second pattern layer 23 is more natural to the human eye, and the human eye would perceive a more seamless and realistic multi-dimensional relief pattern on the composite membrane. Alternatively, light transmittance of the light-transmitting layer 22 may be in a range of 98.7%-99.9%, to produce a multi-dimensional relief visual effect on a composite membrane, while, to lower the relevant performance requirements on the light-transmitting layer 22, making the choice of materials for the light-transmitting layer 22 more diverse.

In an alternative example, the composite membrane further comprises a light-transmitting protection layer 3, the light-transmitting protection layer 3 is disposed on a side of the second pattern layer 23, the side of the second pattern layer 23 facing away from the carrier layer 1, i.e., disposed on the surface of the composite membrane, to protect information layer 2 from damage or corrosion. Further, the light-transmitting protection layer 3 has a certain transparency, so that the human eye can perceive light reflected by the first pattern layer 21 and the second pattern layer 23 through the light-transmitting protection layer 3, i.e., see the pattern with a multi-dimensional relief effect on the composite membrane. It can be understood that the light-transmitting protection layer 3 may be a glue layer.

In an alternative example, the first pattern layer 21, the light-transmitting layer 22, the second pattern layer 23 and the light-transmitting protection layer 3 may all be formed by a coating process or may be formed by other processes.

In an alternative example, during processing and manufacturing of the composite membrane, the first pattern layer 21, the light-transmitting layer 22, the second pattern layer 23 and the light-transmitting protection layer 3 can be processed layer by layer along the thickness direction X of the composite membrane. Further, it may not be processed in the above order, for example, the light-transmitting layer 22 may be formed first, and then the first pattern layer 21 and the second pattern layer 23 may be formed respectively on both sides of the light transmitting layer 22, then, combined with the carrier layer 1.

The composite membrane processing order of the film layers is not limited to the examples described above, and other suitable processing methods can also be employed. The actual processing conditions and processing needs reasonable arrangements.

In an alternative example, the light-transmitting layer 22 may be in a transparent state without color, or may exhibit a certain color. When the light-transmitting layer 22 having a certain color, the light-transmitting layer 22, the first pattern layer 21 and the second pattern layer 23 are superimposed, so that the composite membrane would show a more colorful multi-dimensional relief pattern.

Figure 7:
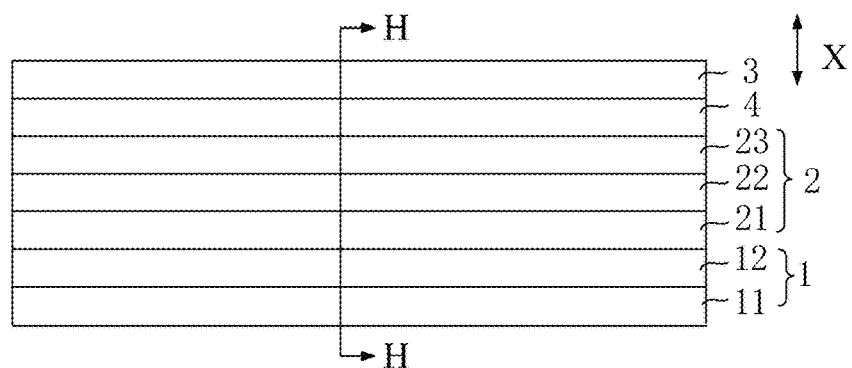
FIG. 7 shows a schematic structure of a composite membrane according to one or more examples of the present disclosure.
Figure 8:
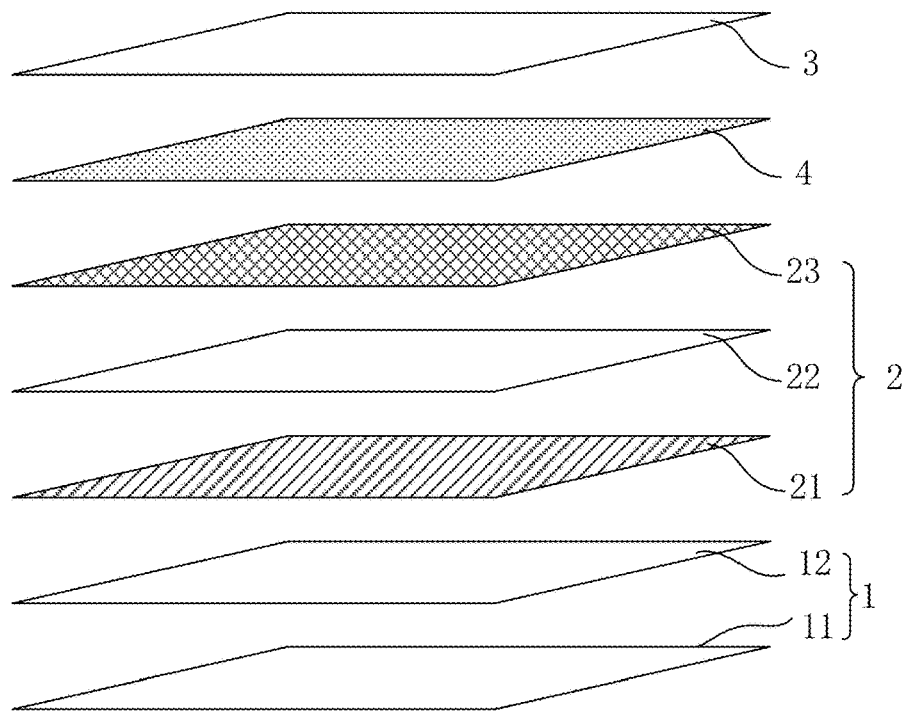
FIG. 8 shows an exploded schematic diagram of FIG. 7.
Figure 9:
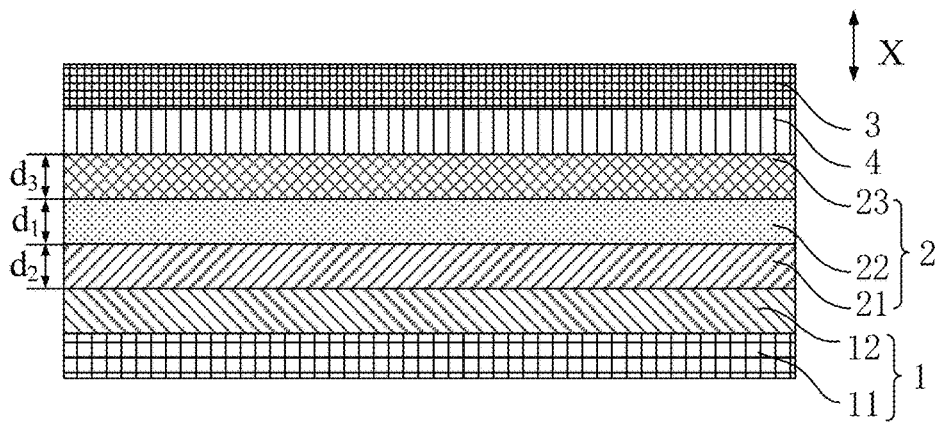
FIG. 9 shows a cross-sectional view of a schematic structure of FIG. 7 in the H-H direction.

In an alternative example, as shown in FIGS. 7 to 9, in order to make the multi-dimensional relief pattern on the composite membrane show metallic luster and enhance the brightness and multi-dimensional sense of the relief pattern, the composite membrane further includes a light-transmitting metal layer 4. The light-transmitting metal layer 4 is provided on a side of the light-transmitting protection layer 3, the side of the light-transmitting protection layer 3 near the second pattern layer 23; i.e., the light-transmitting metal layer 4 is provided between the light-transmitting protection layer 3 and the second pattern layer 23.

It should be noted that the light-transmitting metal layer 4 has certain light-transmitting properties to prevent the multi-dimensional relief pattern from being blocked.

In an alternative example, the light-transmitting metal layer 4 may be provided in a thickness between 1 nm-100 nm. For example, the thickness of the light-transmitting metal layer 4 may be 5±0.4 nm, to ensure transparent performance of the light transmitting metal layer 4.

In an alternative example, the light-transmitting metal layer 4 may be an aluminum layer, a chromium layer, a nickel layer, a copper layer, or an iron layer. The material of the light transmitting metal layer 4 is not restricted, and it may be selected in accordance with required corresponding metal color. The transmissive metal layer 4 may be formed by a plating process, or may be formed by a coating process. When the light-transmitting metal layer 4 is an aluminum layer, it can be formed by an aluminum electrochemical process.

In an alternative example, the carrier layer 1 as the carrier of a first pattern layer 21, a light-transmitting layer 22, a second pattern layer 23 and a light-transmitting protection layer 3, in accordance with different application scenarios of the composite membrane, the structure of the carrier layer 1 is also different. The composite membrane may be a transfer membrane, or may be a non-transfer membrane. As shown in FIG. 1 to FIG. 3, the illustrated composite membrane is a non-transfer membrane, whereas in FIG. 4 to FIG. 9, the composite is a transfer membrane. When the composite membrane is a non-transfer membrane, the carrier layer 1 and the first pattern layer 21 may not be peeled off. When the composite membrane is a transfer membrane, at least part of the carrier layer 1 can be peeled off from the composite membrane.

Figure 4:
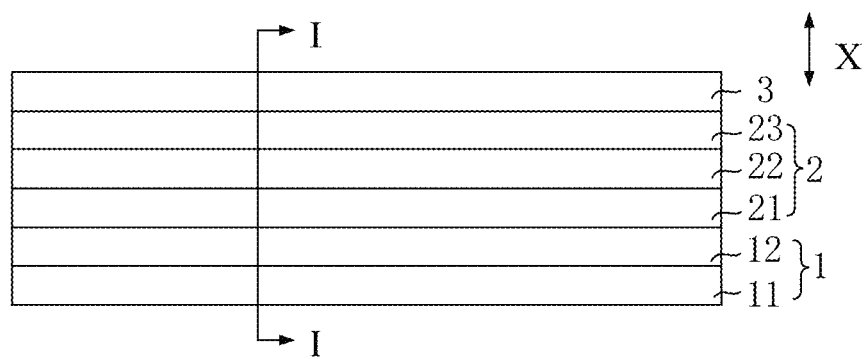
FIG. 4 shows a schematic structure of a composite membrane according to one or more examples of the present disclosure.
Figure 5:
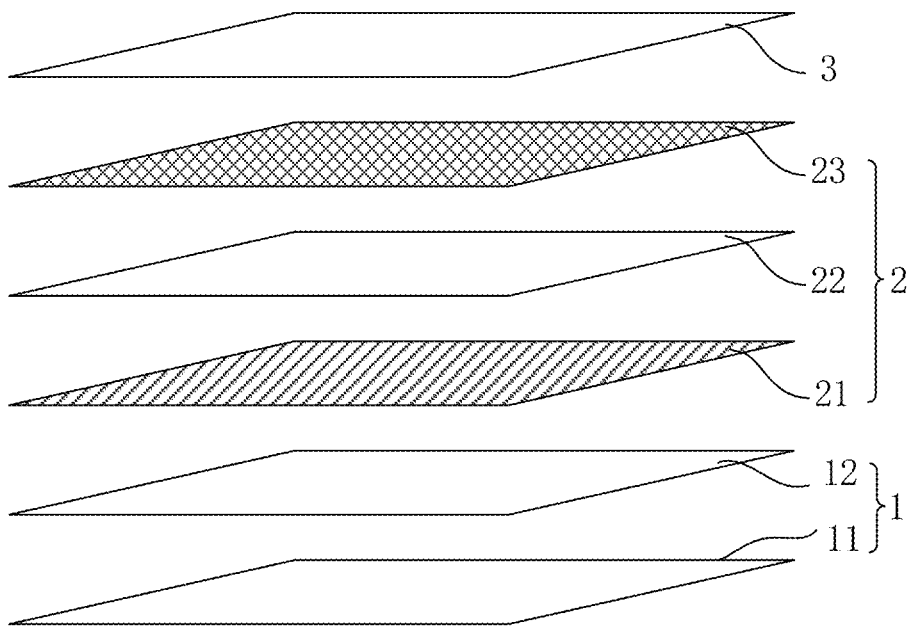
FIG. 5 shows an exploded schematic diagram of FIG. 4.
Figure 6:
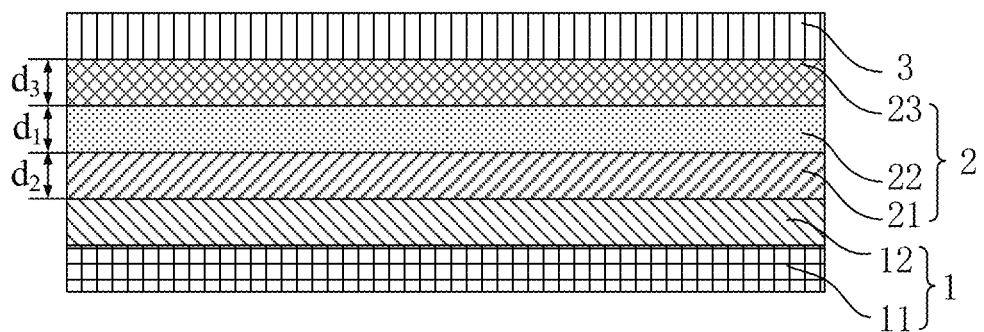
FIG. 6 shows a cross-sectional view of a schematic structure of FIG. 4 in the I-I direction.

In an alternative example, as shown in FIG. 4 to FIG. 6, the carrier layer 1 comprises a base film 11 and a release layer 12 stacked on each other, the release layer 12 is disposed between the base film 11 and the information layer 2. At this time, the composite membrane is a transfer membrane, and the release layer 12 serves as a medium for peeling the first pattern layer 21, the light-transmitting layer 22, the second pattern layer 23 and the light-transmitting protection layer 3 from the base film 11 in the composite membrane. And in the process of use, after the base film 11 is peeled from the composite membrane, the composite membrane can be attached to the surface of the object through the release layer 12 to show the visual effect of multi-dimensional relief.

Specifically, the release layer 12 may be made of organic silicone resin. Organic silicone resin is melted in a heated state, thereby facilitating the first pattern layer 21 etc. to peel off from the base film 11. The thickness of the release layer 12 may between 1.1 nm—of 3.6 nm, thus having good release properties.

The material of the light-transmitting layer 22 is not restricted, as long as it can meet the requirement of the light transmittance corresponding to A, and allow creating a sense of distance between the first pattern layer 21 and the second pattern layer 23.

In an alternative example, the light-transmitting layer 22 may be a polyester resin layer, an epoxy resin layer, a furfural resin layer, a polyfluoro resin layer, or a silicone ether resin layer. At this time, the light-transmitting layer 22 may be cured at a temperature between 120° C.-180° C. The light-transmitting layer 22 has a good heat resistance, with a heat resistance range between 70° C.-210° C. The synthetic resin has a small elastic deformation, and is easy to cut and split, thus help to improve the performance stability of the light-transmitting layer 22, and facilitate creating the sense of distance between the first pattern layer 21 and the second pattern layer 23, i.e., creating a multi-dimensional relief visual effect.

In an alternative example, the dry coating weight of the light-transmitting layer 22 is B, $2\ g/m^2 \leq B \leq 16\ g/m^2$, for example, it can be $2\ g/m^2$, $5\ g/m^2$, $8\ g/m^2$, $10\ g/m^2$, $12\ g/m^2$, $15\ g/m^2$ or $16\ g/m^2$ etc. Thus provided, the light-transmitting layer 22 may allow creating relief stereoscopic visual effect on the first pattern layer 21 and the second pattern layer 23, while the light-transmitting layer 22 having a good light transmitting property.

In an alternative example, as shown in FIG. 3, FIG. 6 and FIG. 9, the size of the light-transmitting layer 22 along the thickness direction X is $d_1$, $1\ \mu m \leq d_1 \leq 8\ \mu m$, for example, 1 µm, 2 µm, 4 µm, 5 µm, 6 µm or 8 µm, etc. Provided the light-transmitting layer 22 thickness satisfies the above conditions, the light-transmitting layer 22, while forming a multi-dimensional visual relief of the first and second pattern on the composite membrane, such thickness also helps to improve the light-transmitting layer 22 structural stability, and further make the composite membrane have higher structural stability.

In an alternative example, in the subsequent manufacturing process, it is difficult to avoid the composite membrane from a certain stretching action. The light-transmitting layer 22, as a film layer disposed between the first pattern layer 21 and the second pattern layer 23, its structure and performance stability have an important influence on the multi-dimensional relief effect of the composite membrane. In order to ensure the performance stability of the composite membrane during subsequent processing, in one example, the tensile strength of the light-transmitting layer 22 is E, $E \geq 4$ MPa. In this way, in the subsequent processing of the composite membrane, even if it is subjected to certain stretching and other actions, the stability of the structure of the light-transmitting layer 22 can still be maintained.

It should be understood, the thickness of the first pattern layer 21 and the second pattern layer 22 is not limited, as long as it may produce visual effects of multi-dimensional relief on the composite membrane.

In an alternative example, as shown in FIG. 3, FIGS. 6 and 9, the first pattern layer 21 has a thickness $d_2$, in the range of 0.5 µm~10 µm, such as the thickness of the first pattern layer 21, $d_2$ can be of 0.5 µm, 1 µm, 2 µm, 5 µm, 6 µm, 8 µm or 10 µm etc. Providing a first pattern layer 21 with a thickness $d_2$ in the above range can effectively improve the binding properties of the first pattern layer 21, the carrier layer 1, and the light-transmitting layer 22, so that the first pattern layer 21 can be more closely bounded to the carrier layer 1 and the light-transmitting layer 22. In addition, such setting can also make the image of the multi-dimensional relief formed on the transfer membrane more realistic.

In an alternative example, as shown in FIG. 3, FIGS. 6 and 9, the second pattern layer 23 has a thickness $d_3$, in a range from 0.5 µm~10 µm, for example, the second pattern layer 23 thickness $d_3$ can be 0.5 µm, 1 µm, 2 µm, 5 µm, 6 µm, 8 µm or 10 µm etc. Similar to the first pattern layer 21, providing the second pattern layer 23 with a thickness in the above range can effectively improve binding properties of the second pattern layer 23 and the light-transmitting layer 22, so that the combination of the two can be more closely. In addition, such setting can also make the image of the multi-dimensional relief formed on the transfer membrane more realistic.

It should be understood, the first pattern layer 21 and the second pattern layer 23 may be formed by a coating process, the coating used to form both layers may be the same or may be different. Further, the first pattern layer 21 and the second pattern layer 23 may be formed by a molding process etc., and this is not restricted.

In an alternative example, the first pattern layer 21 and the second pattern layer 23 are coated with a pattern coating, the pattern coating comprising a coating hyperbranched polyamide-modified aqueous poly (urethane-acrylate) prepolymer emulsion, acrylate-like monomer, acrylate monomer, reactive diluent and photo initiator. Pattern coating prepared in this way has a good gloss, fullness, hardness, flexibility and chemical resistance etc. The first pattern layer 21 and the second pattern layer 23 formed by such coating have a good binding and stability property, making the composite membrane show a more realistic and colorful multi-dimensional relief pattern.

It is understandable that the mass content ratio of hyperbranched polyamide modified waterborne poly (urethane-acrylate) prepolymer emulsion, acrylate monomer, acrylate monomer, reactive diluent and photo initiator in the pattern coating is not restricted or limited. The appropriate ratio of each component can be configured according to the specific color and pattern requirements of the composite membrane.

In an alternative example, the mass ratio of the hyperbranched polyamide modified waterborne poly (urethane-acrylate) prepolymer emulsion, acrylate monomer, acrylate monomer, reactive diluent and photo initiator is (40~60):1:1:(40~65):(1~5). According to the above configuration, the pattern coating produced with such ratio has a better gloss, fullness, hardness, flexibility and chemical resistance etc., to further improve the bonding performance of the first pattern layer 21 and the second pattern layer 23 to adjacent film layers, thereby improving the structural stability of the composite membrane, and making the composite membrane show a fuller, brighter multi-dimensional relief pattern.

In an alternative example, the method for preparing a coating includes: measuring a hyperbranched polyamide modified water-based poly (urethane-acrylate) prepolymer emulsion, after adding acrylic monomers, acrylate monomers, the active diluent, the photo initiator and thoroughly mixing, the coating is obtained. Wherein parts by mass of the hyperbranched polyamide-modified aqueous poly (urethane-acrylate) prepolymer emulsion is 40 to 60 parts, in particular, may be 40 parts, 45 parts, 50 parts, 55 parts or 60 parts etc. Parts by mass of acrylic acid ester monomer is 1 part; parts by mass of the acrylate monomer fraction is 1 part; parts by mass of the reactive diluent can be from 40 to 65 parts, in particular, may be 40 parts, 45 parts, 50 parts, 55 parts, 60 parts or 65 parts etc. Parts by mass of photo initiator agent is 1 to 5 parts, in particular, may be 1 part, 2 parts, 3 parts, 4 parts or 5 parts etc.

It is understandable that the specific types of acrylate monomers, acrylate monomers, reactive diluents and photo initiators in the pattern coating are not limited, and are selected based on actual needs.

In an alternative example, the acrylic monomer may be acrylic acid, methacrylic acid, methyl acrylate or hydroxyethyl methacrylate. Thus, it may help to improve the weathering resistance of the first pattern layer 21 and the second pattern layer 23, and adhesion of both layers to the adjacent layers can be improved, to further enhance the structural stability of the composite membrane.

In an alternative example, the acrylate monomer can be methyl acrylate, ethyl acrylate, 2-methyl methacrylate, 2-ethyl methacrylate or by tripropylene glycol diacrylate. The selection of the above-mentioned materials can have better polymerization performance with other components in the pattern coating, and the prepared coating has superior high temperature oxidation resistance, which is beneficial to improve the structural stability of the composite membrane.

In an alternative example, the reactive diluent can be n-butyl acrylate-styrene, n-butyl acrylate-tripropylene glycol diacrylate or by n-butyl acrylate-trimethylol propane triacrylate. Coating pattern thus prepared has good penetrability, making a first pattern layer 21 and the second pattern layer 23 formed this way has a good toughness.

In an alternative example, the photo initiator can be 2-hydroxy-2-methyl-1-phenyl-1-acetone, 1-hydroxy cyclohexyl phenyl ketone, or 2,2-dimethyl-2-phenylacetophenone. With the above composition, the photo initiator has a high initiator efficiency and stability. The pattern coating, during the process of coating the first pattern layer 21 and the second pattern layer 23, has a high curing rate. The structure of the first pattern layer 21 and the second pattern layer 23 formed in such way is relatively stable.

Examples of the present disclosure further provides a packaging structure, disposed like any of the examples provided in the composite membrane.

Packaging structure examples provided by the present application, with the composite membrane provided in any one of the above-described examples, present specific patterns with the effect of multi-dimensional relief pattern. According to different requirements of different packaged products, the first pattern layer 21 and the second pattern layer 23 are provided correspondingly, to make the packaging structure more appealing.

In some examples, the packaging structure provided with the composite membrane can be printed again according to actual needs, that is, a specific printing pattern is printed on the composite membrane, so that the multi-dimensional relief image and the printed image presented on the composite membrane are superimposed on each other, making the packaging structure present a more gorgeous and colorful visual effect.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A composite membrane, comprising:
a carrier layer; and
an information layer, wherein the information layer is disposed on one side of the carrier layer along a thickness direction of the composite membrane, and the information layer further comprises a light-transmitting layer, a first pattern layer, and a second pattern layer, which are disposed along the thickness direction of the composite membrane, wherein:
  the first pattern layer is disposed close to the carrier layer;
  the light-transmitting layer is disposed on one side of the first pattern layer facing away from the carrier layer; and
  the second pattern layer is disposed on the other side of the light-transmitting layer facing away from the carrier layer, and the second pattern layer and the first pattern layer present different visual information of one multi-dimensional object, wherein the first pattern layer has a first thickness, the second pattern layer has a second thickness, and the first thickness and the second thickness are in a same pre-defined range such that the release layer, the first pattern layer, the light-transmitting layer, and the second pattern layer bind together;
a light-transmitting metal layer disposed on one side of the second pattern layer, wherein the second pattern layer is sandwiched between the light-transmitting metal layer and the light-transmitting layer, and the light-transmitting metal layer permits light to pass through; and
a light-transmitting protection layer disposed on one side of the light-transmitting metal layer facing away from the carrier layer.

2. The composite membrane of claim 1, wherein
the light transmitting metal layer comprises one of an aluminum layer, a chromium layer, a nickel layer, a copper layer, or an iron layer.

3. The composite membrane of claim 1, wherein the carrier layer comprises a base film and a release layer stacked on each other, and the release layer is disposed between the base film and the information layer.

4. The composite membrane of claim 1, wherein light transmittance of the light-transmitting layer is A, and A≥98.7%; and
the light-transmitting layer comprises a polyester resin layer, an epoxy resin layer, a furfural resin layer, a polyfluoro resin layer, or a silicone ether resin layer.

5. The composite membrane of claim 1, wherein dry coating weight of the light-transmitting layer is B, and 2 g/m2≤B≤g/m2;
thickness of the light-transmitting layer along the thickness direction is d1, 1 μm≤d1≤8 μm; and
tensile strength of the light-transmitting layer is E, and E MPa.

6. The composite membrane of claim 1, wherein thickness of the first pattern layer is between 0.5 μm~10 μm; and thickness of the second pattern layer is between 0.5 μm~10 μm.

7. The composite membrane of claim 1, wherein the first pattern layer and the second pattern layer are made by pattern coating, the pattern coating comprises a hyperbranched polyamide-modified aqueous poly (urethane-acrylate) prepolymer emulsion, acrylate-like monomers, acrylate monomers, reactive diluents and photo initiators.

8. The composite membrane of claim 7, wherein,
a mass ratio of the hyperbranched polyamide-modified aqueous poly (urethane-acrylate) prepolymer emulsion, the acrylate monomer, the acrylate-like monomer, the reactive diluent and a photo initiator is (40-60):1:1:(40-65):(1-5).

9. The composite membrane of claim 7, wherein the acrylate-like monomer comprises acrylic acid, methacrylic acid, methyl acrylate, or hydroxy ethyl methacrylate;
the acrylate monomer comprises methyl acrylate, ethyl acrylate, 2-methyl methacrylate, 2-ethyl methacrylate, or tripropylene glycol diacrylate;
the reactive diluent comprises n-butyl acrylate-styrene, n-butyl acrylate-tripropylene glycol diacrylate, or n-butyl acrylate-trimethylolpropane triacrylate; and
the photo initiator comprises 2-hydroxy-2-methyl-1-phenyl-1-acetone, 1-hydroxy cyclohexyl phenyl ketone, or 2,2-dimethyl-2-phenylacetophenone.

10. A packaging structure, comprising a composite membrane, wherein the composite membrane further comprises:
a carrier layer; and
an information layer, wherein the information layer is disposed on one side of the carrier layer along a thickness direction of the composite membrane, and the information layer further comprises a light-transmitting layer, a first pattern layer, and a second pattern layer, which are disposed along the thickness direction of the composite membrane, wherein:
the first pattern layer is disposed on the release layer, wherein the release layer is sandwiched between the base film and the first pattern layer;
the light-transmitting layer is disposed on the other side of the first pattern layer facing away from the carrier layer; and
the second pattern layer is disposed on one side of the light-transmitting layer facing away from the carrier layer, and the second pattern layer and the first pattern layer present different visual information of one multi-dimensional object, wherein the first pattern layer has a first thickness, the second pattern layer has a second thickness, and the first thickness and the second thickness are in a same pre-defined range such that the release layer, the first pattern layer, the light-transmitting layer, and the second pattern layer bind together;
a light-transmitting metal layer disposed on one side of the second pattern layer, wherein the second pattern layer is sandwiched between the light-transmitting metal layer and the light-transmitting layer, and the light-transmitting metal layer permits light to pass through; and
a light-transmitting protection layer disposed on one side of the light-transmitting metal layer facing away from the carrier layer.

11. The packaging structure of claim 10,
wherein the light transmitting metal layer is provided between the light-transmitting protection layer and the second pattern layer, and the light transmitting metal layer comprises one of an aluminum layer, a chromium layer, a nickel layer, a copper layer, or an iron layer.

12. The packaging structure of claim 10, wherein the carrier layer comprises a base film and a release layer stacked on each other, and the release layer is disposed between the base film and the information layer.

13. The packaging structure of claim 10, wherein light transmittance of the light-transmitting layer is A, and A≥98.7%; and
the light-transmitting layer comprises a polyester resin layer, an epoxy resin layer, a furfural resin layer, a polyfluoro resin layer, or a silicone ether resin layer.

14. The packaging structure of claim 10, wherein the first pattern layer and the second pattern layer are made by pattern coating, the pattern coating comprises a hyperbranched polyamide-modified aqueous poly (urethane-acrylate) prepolymer emulsion, acrylate-like monomers, acrylate monomers, reactive diluents and photo initiators.

* * * * *